(12) United States Patent
Sethi et al.

(10) Patent No.: US 7,756,852 B2
(45) Date of Patent: *Jul. 13, 2010

(54) CONCURRENT EXECUTION OF GROUPS OF DATABASE STATEMENTS

(75) Inventors: Ajay Sethi, Bangalore (IN); Kirk Bradley, San Francisco, CA (US); Ritesh Molani, Indore (IN); Sameer Shisodia, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/837,152

(22) Filed: Apr. 30, 2004

(65) Prior Publication Data

US 2005/0165801 A1 Jul. 28, 2005

Related U.S. Application Data

(60) Provisional application No. 60/538,485, filed on Jan. 21, 2004.

(51) Int. Cl.
*G06F 7/00* (2006.01)

(52) U.S. Cl. .................................. 707/713
(58) Field of Classification Search ............... 707/100
See application file for complete search history.

(56) References Cited

U.S. PATENT DOCUMENTS 5,774,727 A 6/1998 Walsh et al.
5,924,096 A * 7/1999 Draper et al. ............... 707/10
6,275,818 B1 * 8/2001 Subramanian et al. ....... 707/2
6,502,095 B2 * 12/2002 Breitbart et al. ............. 707/8
6,594,651 B2 * 7/2003 Kabra et al. ................. 707/2

(Continued)

OTHER PUBLICATIONS

"SQL Server Task Scheduling" retrieved on Oct. 28, 2005 from the Internet< URL: http://doc.ddart.net/mssql1/se170/8_ar_sa_22.htm > 1 page.

(Continued)

*Primary Examiner*—Tim T. Vo
*Assistant Examiner*—Aaron Sanders
(74) *Attorney, Agent, or Firm*—Hickman Palermo Truong & Becker LLP

(57) ABSTRACT

A method and apparatus for executing groups of database statements is provided. An indication is included in database statements to indicate whether instructions need to be executed in a particular sequence with respect to one another. In an embodiment, statements that need to be executed sequentially with respect to one another are included in the same bundle. In an embodiment bundles do not need to be executed in any particular order with respect to one another. A mechanism has been presented to enable statements to be executed concurrently by the server. In an embodiment, groups of database statements are sent from a client-side to a server within batches including one set of transmission information for the entire batch. In an embodiment, within a batch there may be one or more bundles. In an embodiment, the bundles are always executed sequentially; however, different bundles within a batch can be executed concurrently.

26 Claims, 6 Drawing Sheets

U.S. PATENT DOCUMENTS

| | | |
|---|---|---|
| 6,871,298 B1 | 3/2005 | Cavanaugh et al. |
| 7,092,931 B1 * | 8/2006 | Kaluskar et al. ............... 707/2 |
| 2002/0147855 A1 * | 10/2002 | Lu ............................. 709/310 |
| 2003/0105795 A1 | 6/2003 | Anderson et al. |
| 2003/0188132 A1 | 10/2003 | Keltcher et al. |
| 2003/0233632 A1 * | 12/2003 | Aigen et al. ................ 717/106 |
| 2004/0059738 A1 * | 3/2004 | Tarbell ....................... 707/100 |
| 2004/0059894 A1 * | 3/2004 | Rovati et al. ................ 712/210 |

OTHER PUBLICATIONS

"TabTag" retrieved on Oct. 28, 2005 from the Internet< URL: http://www.tabtag.com/support/faq.aspx> 1 page.

"Understanding When the Workload Governor is Activated" retrieved on Oct. 28, 2005 from the Internet< URL: http://msdn.microsoft.com/library/en-us/architec/8_ar_sa2_6dip.asp?frame=true > 3 pages.

* cited by examiner

CONCURRENT EXECUTION OF GROUPS OF DATABASE STATEMENTS

PRIORITY CLAIM; RELATED APPLICATION

This application claims benefit of prior U.S. Provisional Application Ser. No. 60/538,485, "entitled "Executing a Group of Database Statements" filed by Ajay Sethi, et al., on Jan. 21, 2004 and is related to Ser. No. 10/837,173, entitled "Support for Executing a Group of Database Statements", filed by Ajay Sethi, et al. on Apr. 30, 2004, the contents of which are herein incorporated by reference as if originally set forth herein.

FIELD OF THE INVENTION

The present invention relates to client-server communications in general. More specifically, the present application relates to sending statements for execution by a database server.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the field of databases, clients send database commands, such as Structured Query Language (SQL) statements, to a database server for execution. Each of the SQL statements is sent to the database server in a separate call to the interface of the database server.

In the past, while executing client programs with processing logic statements, all the SQL statements were sent one-by-one to the server and executed. When each SQL statement is sent to the server, transmission information is also sent from the client to the server. Such transmission information may include, for example:

1. Function code generated from the SQL statement.
2. A cursor identification indicating whether the statement executed previously.
3. A length of the SQL statement.
4. The text of the SQL statement.
5. Flags for identifying the SQL statement.
6. The length of an input array containing various input parameters.
7. The actual input array.
8. A list of binds for parameter values that need to be bound to the SQL statement.
9. A number identifying how many binds are being sent for the SQL statement.
10. A list of defines for defining variables to which the parameter values are to be bound.
11. A number indicating the number of the defines.
12. The length of the transaction context for the SQL statement.
13. The actual transaction context for the SQL statement.

Additional transmission information may also be sent along with the SQL statement. The transmission information is sent to server for every SQL statement. The present inventors have recognized that at least some of the transmission information, such as the length of the transaction context and the actual transaction context, is common to all the SQL statements. In this specification, the phrase database statement is generic to a query, any place a database statement is mentioned the word "query" may be inserted instead to obtain a more specific example. For example, a database statement may be any SQL statement (SQL DDL, SQL DML, or an SQL query) or PL/SQL statement that can be invoked by a client (such as an anonymous block, an EXECUTE IMMEDIATE statement, or a CALL statement to a PL/SQL procedure/function).

Prior SQL engines do not concurrently process more than one database statement per session at a time. Although parallel processing may be performed for instructions associated with the same database statement (e.g., an insert statement may be executed by causing several slave processes to insert in parallel), parallel processing is not performed across database statements. Similarly, query slaves or database statement slaves may perform various tasks in parallel that correspond to a single query or database statement, but do not perform in parallel tasks associated with different database statements. Consequently, although instructions associated with the same database statement may be processed in parallel, instructions associated with different database statements are processed sequentially.

Although it may be possible to effect parallel execution of different database statements by writing code to essentially start concurrent client sessions and invoking the database server from each of them, concurrent execution in this fashion is cumbersome.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
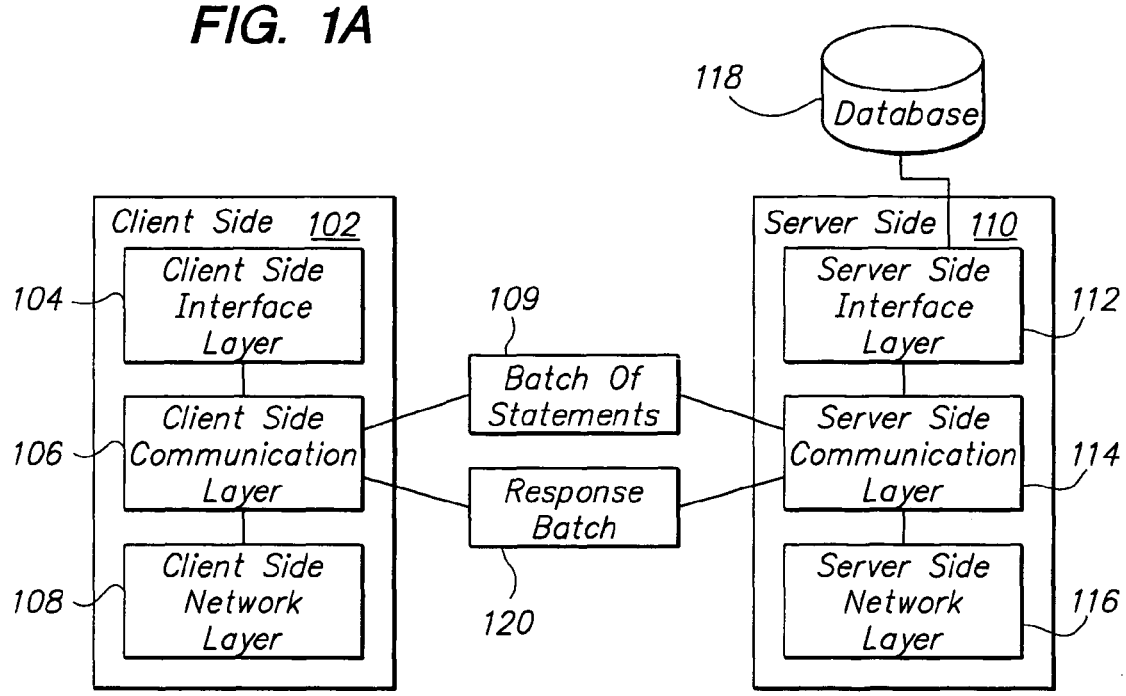
FIG. 1A shows an example of a system for accessing data in a database, according to an embodiment of the invention.

A method and apparatus for providing support for executing groups of database statements, such as Structured Query Language (SQL) statements, is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature may not address any of the problems discussed above or may only address one of the problems discussed above. Some of the problems discussed above may not be fully addressed by any of the features described herein. Although headings are provided, information related to a particular heading, but not found in the section having that heading, may also be found elsewhere in the specification.

Functional Overview of Various Embodiments of the Invention

There are classes of database applications, such as complex report generation and data warehousing applications, that present opportunities for improving performance using a batch based client-server communication protocol. For such database applications, multiple database statements can be sent together to a server in a batch. In an embodiment, the batching of the database statements (i.e., the placing of database statements in a batch) is performed in manner that improves the turnaround time of all of the database statements batched together. The batched communications may result in a reduction in the round-trip overhead of executing the database statements, because a batch of database statements is sent to the server all at once. When the database statements are bundled together and sent to the server, the transmission data may be sent only once. Consequently, by using batched database statements, the turnaround time for returning results of the execution of the database statements to the client is reduced. Additionally, the amount of data sent to the server is also reduced.

In order to more fully understand the reduction of data sent, consider the communication between a client and a server when database statements are sent. By batching a sequence of database statements and sending the database statements to the server, there is a reduction in the communication overhead, the number of context switches between the client (such as OCI) and the database server, and the number of request and reply sequences between the client and the server. The reduction in the number of context switches, the number of request and reply sequences, and in the number of times the transmission data is sent to the server helps improve performance.

In an embodiment, batch transmission of database commands is facilitated by an application interface (which in an embodiment includes a Call Interface (CI) communication protocol, such as the Oracle Call Interface (OCI)) for batch statement execution, and a program interface communication protocol for batch statement execution (which in an embodiment includes a Program Interface (PI), such as the Oracle Program Interface (OPI)). The structure for representing a batch of database statements and the mechanism for communicating (e.g., sending and/or receiving at both the client and server) a batch of database statements over the network is also described. In an embodiment, a batch of database statements may contain one or more bundles of database statements. In one embodiment, the statements within a bundle must be executed sequentially with respect to one another. However, there are no requirements regarding the sequence of the execution of statements in each of the bundles with respect to statements in other bundles. The statements in different bundles may be executed concurrently (e.g., in parallel), for example.

In the techniques described herein for communicating database statements in batches, the bundles may be used regardless of whether the database server is capable of concurrently executing multiple relational database instructions (such as SQL statements). For servers that support concurrent execution, the use of batches leads to a reduction in execution time, because the server is aware that the database statements in different bundles may be processed in parallel.

Additionally, in an embodiment, the batches and bundles therein do not add a significant amount of processing time or otherwise significantly degrade the performance of servers that do not support concurrent execution of database statements. Although two statements may be executed in any order with respect to one another, the server takes care of associating the results with the appropriate statements, and the programmer or client-side program does not have to do any special processing. In an embodiment, although various database statements are processed in parallel, the results of the processing are returned in the order presented to the server or in another embodiment the execution results are returned in the order that the corresponding database statements are listed in the human readable code written by the programmer. Keeping the order of the response the same as in the request helps ensure that the existing communication overhead for sending the results between the client and server does not increase as a result of the parallel processing and/or batching of the statements. If the order of the response is the same as in the request, the client communication layer essentially only needs to read the results in the order that the statements of the batch are sent, reducing the communication overhead when compared to were the results sent in another order. In an embodiment, the client may not know whether the server processed the database statements sequentially or in parallel. The use of batches is useful for database applications, such as complex report generation and data warehousing, that contain large numbers of database statements.

Client Server Communication

FIG. 1A shows a system 100 for accessing data in a database according to an embodiment of the invention. System 100 has client-side 102, which includes client-side interface layer 104, client-side communication layer 106, and client-side network layer 108. System 100 also has batch of statements 109 and server-side 110, which includes server-side interface layer 112, server-side communication layer 114, and server-side network layer 116. System 100 also includes database 118 and a response to batch 120. In alternative embodiments, system 100 may not have all of the components listed above or may have other components in addition to or instead of those listed above.

In an embodiment, the client-side 102 allows a user to enter database statements and sends database statements to the server-side for execution. Client-side 102 also receives results of the execution of the database statements, and presents the results to the user.

Client-side interface layer 104 is within the same logical layer as the database application that issues the database statements, and is the interface between the database application and other components on the client-side 102. The database application issues the database statements by calling client-side interface layer 104, and receives results of the execution of the database statement through client-side interface layer 104.

According to an embodiment of the invention, client-side communication layer 106 sends database statements from client-side 102 to server-side 110, and receives results of executing the database statements from server-side 110 to client-side 102. Client-side communication layer 106 supports the use of batches of database statements in which some or all the statements within a given batch may be grouped into bundles. Batches and their bundles will be discussed in greater detail in conjunction with FIG. 2, below. Client-side communication layer 106 differs from prior art communication layers in that Client-side communication layer 106 is used for sending database statements and transmission data associated with the batches and their bundles.

Client-side network layer 108 sends network level communications (e.g., TCP/IP communications) from client-side 102 to server-side 110, and receives network level communications from server-side 110 to client-side 102.

Batch of statements 109 generally represent a plurality of database statements, being sent from the clients-side 102 for execution on the server-side 110. Batch of statements 109 include a plurality of database statements, and may be organized into bundles.

The server-side 110 receives database queries and other database statements from client-side 102, and is the location to which client-side 102 sends the database statements for execution. Server-side 110 executes the database statements, and returns the results of the execution to client-side 102. The components of client-side 102 and the components of server-side 110 may run on the same machine, or may run on different machines connected by a network connection.

Server-side interface layer 112 is the interface between the database server and other programs. The program interface of the server resides at the server-side interface layer 112. Additionally, an administrator may interface with server-side 110 via server-side interface layer 112. A database statement coming from server-side communication layer 114 is provided to server-side 110 via server-side interface layer 112. Server-side interface layer 112 passes results of the execution to server-side communication layer 114.

Server-side communication layer 114 passes a batch of statements 109 received from client-side communication layer 106 to server-side interface layer 112, and sends results of executing batch of statements 109 received from server-side interface layer 112 to client-side communication layer 106. Similar to client-side communication layer 106, server-side communication layer 114 supports the use of batches and bundles of database statements.

Server-side network layer 116 receives network level communications from client-side 102, and sends network level communications to client-side 102.

Database 118 is the database upon which the database statements operate. A response to batch 120 is a batch of results from executing a batch of statements 109, which are sent from server-side communications layer 114 to client-side communication layer 106.

The overall flow of data through client-side interface layer 104 and server-side interface layer 112, client-side communication layer 106 and server-side communication layer 114, and client-side network layer 108 and server-side network layer 116 is for use in the sending batches of database statements (such as SQL statements) from client-side 102 to the server-side 110 and getting a response back from server-side 110 to client-side 102. Client-side communication layer 106 and server-side communication layer 114 differ from prior art communication layers in that they support a batch transmission of database commands to the server-side 110, and batch transmission results to the client-side 102.

The request for the processing of the batches originates in client-side 102 at client-side interface layer 104 and travels "down" to client-side communication layer 106. Client-side communication layer 106 passes on the statements as a "batch" of statements to server-side communication layer 114 of server-side 110.

In an embodiment, on server-side 110, upon detecting or receiving information that a batch of statements 109 is about to come, the communication driver of server-side communication layer 114 collects the statements until it receives all the statements in the batch 109. In an embodiment, at client-side 110, the communication driver of client-side communication layer 106 waits until messages for all the bundles and/or other statements within the batch are received, and only then is the batch passed to the server-side interface 112.

Figure 1B:
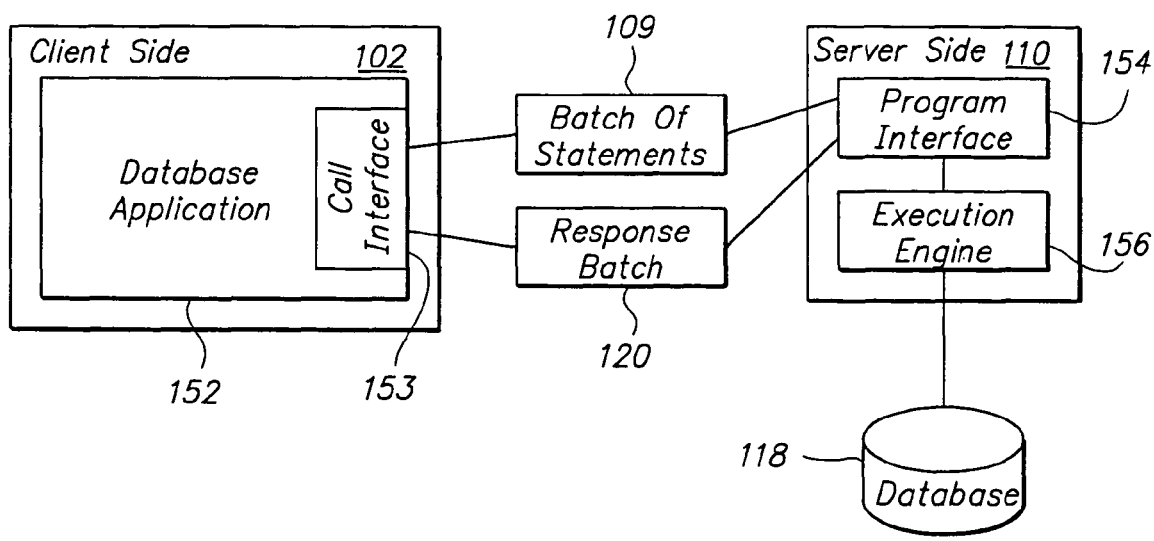
FIG. 1B shows another logical view of a system for accessing data in a database, according to an embodiment of the invention.

FIG. 1B shows another logical view of system 100. System 100 includes database application 152, call interface 153, program interface 154, and execution engine 156. Alternatively, FIG. 1B may be a different embodiment than that of FIG. 1A.

Database application 152 issues database statements to the server-side 110 as a batch of statements 109. Database application 152 may also receive a response to batch 120. Call interface 153 is used for sending batch of statements 109 from application 152 to server-side 110. Call interface 153 may also be used for receiving a response to batch 120. In addition, call interface 153 supports inserting indications regarding which statements belong to a particular batch and/or bundle. Call interface 153 supports sending one set of transmission data for an entire batch.

Program interface 154 receives batch of statements 109, and passes the batch of statements 109 to the execution engine 156 for execution. Specifically program interface 154 places batch of statements 109 into buffers, which will be referred to as pre-execution buffers, and groups the statements according to the bundles in which they belong. Program interface 154 is part of server-side interface layer 112. Execution engine 156 executes batch of statements 109 after they have been prepared for execution. Execution engine 156 performs the operations specified by the database statements of batch of statements 109 on data within database 118, and returns the results of the execution to program interface 154.

Batches and their Bundles

Figure 2A:
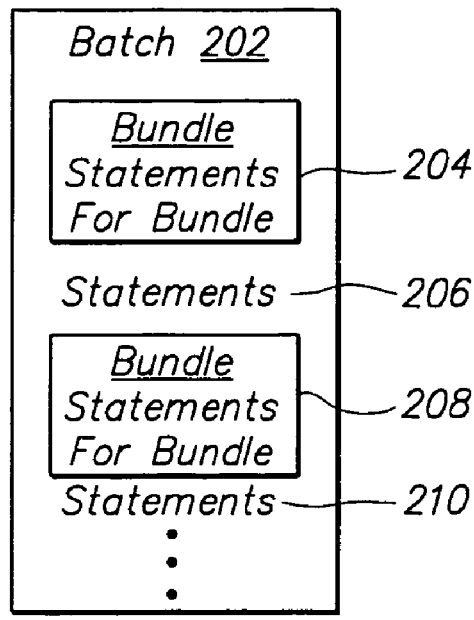
FIG. 2A shows an example of a batch of statements that may be used in the system of FIG. 1A or 1B.

FIG. 2A is a block diagram illustrating a batch 202 of statements according to an embodiment of the invention. Batch 202 includes bundle 204, statements 206, bundle 208, and statements 210. Alternative embodiments may not have all of the components of batch 202 or may have other components in addition to or instead of those of batch 202.

FIG. 2A is an overall representation of a format in which database statements may be batched together and sent from client-side 102 (FIG. 1A or 1B) to server-side 110. Batch 202 shows the contents of an embodiment of batch of statements 109. Bundles 204 and 208 are collections of individual distinct database statements. All database statements within each of bundles 204 and 208 are to be executed in sequential order relative to the statements in the same bundle. The statements in any given bundle (e.g., bundles 204 and 208) do not have any restrictions on the sequence in which they are executed with respect to statements in other bundles. For example, statements in either of bundles 204 and 208 may be executed concurrently or in any other order with respect to statements in the other of bundles 204 and 208 and/or any other bundles.

Bundles 204 and 208 may each contain any number of distinct database statements. In an embodiment, one or more statements 206 may be placed between bundles 204 and 208. Alternatively, although not illustrated, there may not be any statements that are outside of all bundles. In an embodiment, there may also be one or more statements before bundle 204.

Similarly, one or more statements 210 may be placed after bundle 208. As indicated by the three dots, there may be any number of bundles within batch 202, and between any two bundles there may be other statements. Statements 208, 210, or any other statement not within any bundle may be run in any order with respect to other statements and bundles.

In an embodiment, bundles 204 and 208 may contain an indication of the start of the bundles 204 and 208, and an indication of the end of the bundles 204 and 208. Server-side communication layer 114 and/or program interface 154 may use the indication of the start and end of bundles 204 and 208 to know the beginning and end of bundles 204 and 208.

Figure 2B:
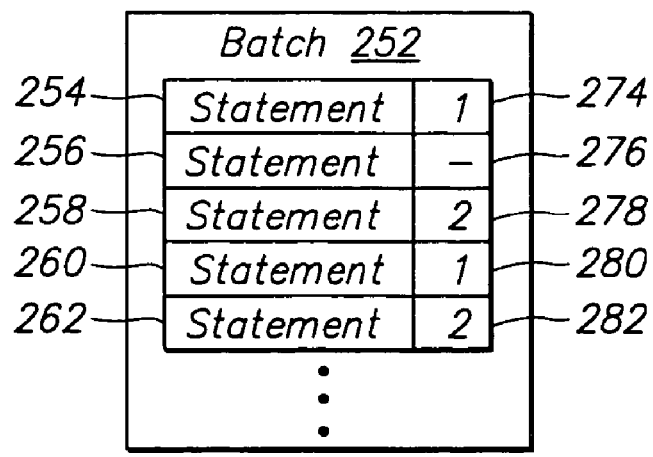
FIG. 2B shows another example of a batch of statements that may be used in the system of FIG. 1A or 1B.

FIG. 2B is a block diagram of a batch 252, according to an alternative embodiment. Batch 252 has statements 254, 256, 258, 260, and 262. Statements 254, 256, 258, 260, and 262 include bundle indications 274, 276, 278, 280, and 282, respectively. Alternative embodiments, may not have all of the components of batch 252 may have other components in addition to or instead of those of batch 252.

Batch 252 shows the contents of an embodiment of batch of statements 109. Statements 254, 256, 258, 260, and 262 are database statements, which are sent for execution at server-side 110. The values in bundle indications 274, 276, 278, 280, and 282 indicate the bundle to which each of statements 254, 256, 258, 260, and 262 belongs. For example, statement 254 belongs in bundle "1" as indicated in bundle indication 274. Similarly, bundle indication 278 and bundle indication 282 indicate that statements 258 and 262, respectively, belong to bundle 2. Bundle indication 276 is blank, thereby indicating that statement 256 does not have a bundle. In other embodiments, other values may be used to indicate that a statement does not belong to any bundle. Using bundle indications 274, 276, 278, 280, and 282, server-side 100 may determine the sequence restrictions relevant to executing statements 254, 256, 258, 260, and 262 without relying on the order in which statements 254, 256, 258, 260, and 262 arrive at server-side 110 or are sent from client-side 102. Also, in batch 252 there is no need to send an indication regarding the start or end of a particular bundle. Although only five statements are illustrated in FIG. 2A, batch 252 may have any number of statements.

Execution of Statements in Bundles

All of the statements within a single bundle, such as bundles 204 and 208 of batch 202 or bundles 1 and 2 of batch 252, are executed sequentially relative to each other. When all of the operations specified by the statements can be performed at the same node, all of the statements may be assigned to be executed by the same slave. The slave executing the bundle acts as the query coordinator or statement coordinator for the statements of the bundle. The slave may also be referred to as a query controller or statement controller. The slave executes the statements of the bundle one at a time according to the sequence indicated by the bundle. If one of the statements of the bundle has a scope for parallelism for the instructions associated with that statement, the slave exploits that parallelism in a manner similar to the usage of parallelism for an ordinary database statement execution, executing tasks associated with the same database statement in parallel. In other words, if the instructions associated with a distinct statement may be executed concurrently with respect to one another, those tasks are executed concurrently.

Batch Function Code

In an embodiment, in order to send batch 202 (FIG. 2A) or batch 252 (FIG. 2B) to server-side 110 (FIG. 1A or 1B) all at once, a new function code, which will be referred to as batch function code, is added to client-side communication layer 106 and server-side communication layer 114 (FIG. 1A) and/ or to call interface 153 and program interface 154 (FIG. 1B).

With the help of the batch function code, server-side 110 recognizes that it has received a batch, and that the batch includes bundles.

The Communication Layer

The client-side communication layer 106 sends and server-side communication layer 114 (FIG. 1A) receives the batch in the same format, as described in FIG. 2A or 2B, for example. The client-side communication layer 106 and/or server-side communication layer 114 form buffers (the pre-execution buffers) corresponding to the format of FIG. 2A or 2B. The client-side communication layer 106 and/or server-side communication layer 114 sends the contents of the pre-execution buffer for execution at server-side 110. In an embodiment, as batch of statements 109 are received at server-side 110, they are stored in a plurality of pre-execution buffers. Those statements, within batch of statements 109, that belong to the same bundle are stored in the same pre-execution buffer. Those statements, within batch of statements 109, that belong to different bundles are stored in different pre-execution buffers. In an embodiment, although bundles may be executed concurrently relative to each other, none of the statements of a batch are executed until the entire batch is received at the server-side 110. Waiting for the entire batch to be received may help ensure that none of the bundles are executed without all of its statements or pertinent transmission data. In an alternative embodiment, a given bundle may be executed before the entire batch is received as long as the transmission information and the entire bundle are received at server-side 110. In other words, once all of the statements of a bundle are received, the pre-execution buffer may be emptied, and the statements in the pre-execution buffer may be sent for execution at execution engine 156 to perform operations on database 118 (provided that sufficient transmission information has been received), because there is no sequence restrictions of the bundle with respect to other statements outside of the bundle or in other bundles. Storing the statements of the same bundle in the same pre-execution buffer and waiting for all statements of the bundle to be received before executing them facilitates executing the statements of the same bundle according to their sequence. The client-side communication driver of client-side communication layer 106 waits until the entire batch is sent to server-side 110, and a response is received by client-side 102 from server-side 110 for all the bundles of database statements 109, before indicating that the execution is complete.

When execution engine 156 of server-side 110 finishes the execution of the bundles of database statements, server-side 110 makes use of two communication flags related to the batch. In an embodiment, all of the communications from server-side 110 to client-side 102 are performed with the help of the two flags related to batches. The two flags are:

(1) The Transmit Terminal Information Start Batch Response (TTISBR) flag, which is a message sent by the server before it starts sending the results for the entire batch of database statements. The TTISBR flag is an indication to client-side 102 to enter the batch mode, which is the state of being prepared to receive and handle the results of a previously-sent batch.

(2) The Transmit Terminal Information End Batch Response (TTIEBR) flag is a message sent after the results for the entire batch (for all the database statements in a batch) are completed. The TTIEBR flag is used to inform the client-side that the client-side can exit the batch mode.

In an embodiment, the server-side 110 sends the results of the database statements in a batch in the same order as the order in which the database statements were sent to server-side 110 from client-side 102. Because the statements in different bundles may have been executed in any order, the order of the results does not necessarily reflect the order of the execution of the statements. To keep the order of the response the same as the request, temporary buffers, which will be referred to as post execution buffers, are created for the messages that server-side 110 intends to send back to the client-side 102 for each statement bundle. A list of these post execution buffers is maintained in which the statements associated with the post execution buffers are in the same order in which the statements and bundles were located inside the batch. The contents of the post execution buffers are dispatched to the client in the order listed, from the beginning of the list to the end of the list, for example.

In order to create and manage the pre-execution buffers, server-side 110 creates multiple slaves, which act as query controllers or statement controllers, for the statements and/or bundles to be executed. Messages from the slaves related to each of these statements are redirected into the pre-execution buffer created for that statement. The slaves wait until the first post execution buffer is marked as full, and then send the first post execution buffer's messages to client-side 102. The first post execution buffer is marked as full once the execution of the first statement and/or bundle is complete. Next, the slaves wait for the second post execution buffer in the list to fill before sending the second post execution buffer's messages to client-side 102. The process of waiting for each post execution buffer to fill and sending the buffer to client-side 102 is performed for each batch. In an embodiment, the entire batch is sent to the client-side 102 at one time. In an embodiment, the proportion of execution time to the time spent in reading the results sequentially is insignificant. In an embodiment, code that was not written for parallel processing may be converted for parallel processing by inserting flags into the code indicating the batch and bundle to which each statement belongs.

Batch Structure Definition

The batch function code receives input from a batch structure definition, which defines the structure and/or properties of batch 202 or 252. The fields of the batch definition describe the properties of batch 202 or 252. The batch definition contains fields such as, but not limited to fields for (1) the total number of bundles in the entire batch 202 or 252, (2) the number of database statements in the entire batch 202 or 252, (3) a list of the number of database statements in each bundle, and (4) a list of the lengths of each database statement in each bundle, for example.

The batch definition also contains fields similar to other protocols, but that differ in that they support batches. For example, in place of a field that referred to a parameter of a single database statement the protocol may support a list of parameters. The batch definition also has fields that contain information about the lists of defines, the binds, the number of binds, and the number of defines in each database statement in a bundle of the batch, or in the entire batch.

For example, in an embodiment the client-side communication layer 106 (FIG. 1A) or the call interface 153 (FIG. 1B) sends:

1) an indication to the database server that function code is going to come next;
2) function code for the batch statements; and
3) inline values in batch structure, which are
   a) the number of batches, and
   b) the number of database statements.

Some parameters that may be sent for creating a buffer for a set of database statements are, for example, as follows:

4) the number of database statements in the batch (for example, the number 7);
5) the concatenated text of the database statements (e.g., dbs1‖dbs2‖ . . . ‖dbsN, where dbs1, dbs1, . . . dbs2 are distinct database statements);
6) the length of each database statement (e.g., len1, len2, . . . , lenN, where len1, len2 . . . , lenN are the lengths of the individual database statements), as required by some SQL engines;
7) flags corresponding to the database statements (flg1, flg2, . . . , flgN, where flg1, flg2, . . . , flgN are the flags corresponding to the database statements);
8) the length of an array of input parameters;
10) a list of number of binds for each database statement;
11) buffers for the list of binds;
12) a list of the number of defines for each database statement, which is required while reading defines at the server; and
13) buffers for the list of defines.

More specifically, an example of the syntax of a batch structure definition statement is as follows.

Struct BatchDefinition

```
{
Ub4 num_of_bundle; /* The value of num_of_bundle is the number of bundles (sent
        from client-side 102 to server-side 110), which may
        have the type of unsigned byte, 4 bytes long (Ub4). */
Ub4 num_of_sql; /* The value of num_of_sql is the total number of database
        statements in the entire batch, which in this
        embodiment are in SQL. However, in other
        embodiments another database language may be used.
        */
Ub4 list_num_sql; /* The value of list_num_sql is a list of the total number of
        database statements in each bundle. */
Ub4 list_length_sql; /* The value of list_length_sql is a list of the total length of each
        database statements in each bundle. */
Int *sql_text; /* The value of *sql_text is a pointer to the text of the entire batch of
        database statements, which may be of the type integer.
        */
Ub4 *sql_flag; /* The value of *sql_flag is a pointer to the flags for each database
        statement used by the database engine for processing
        the database statements. */
Ub4 cur_id; /* The value of cur_id is an indication whether the database statement is
        executing for first time. */
```

-continued

```
Ub4 *input_array; /* The value of *input_array may be a pointer to an input array of
            various parameters associated with the batch such as a
            number of iterations and the System Commit Number
            (SCN) associated with running the batch. */
Ub4 input_array_length; /* The value of input_array_length is the length of the
            input array. */
Ub4 *output_array; /* The value of *output_array is a pointer to an output array
            containing updated values for the parameters of the
            input array. */
Ub4 output_array_length; /* The value of output_array_length is the length of the
            output array. */
Ub4 *prefetch_buffer_list; /* The value of *prefetch_buffer_list is a pointer to a list
            of the sizes of pre-execution buffers for storing
            statements prior to execution and/or of post execution
            buffers for storing execution results prior to sending
            them to client-side 102. In an embodiment, there may
            be other parameters for specifying other information
            regarding the pre-execution and/or post execution
            buffers for receiving the batches and their bundles prior
            to and/or after execution, respectively. */
Ub4 *bind_list; /* The value of *bind_list is a pointer to a list of binds for each
            database statements (the values that are "bound" to the
            input parameters associated with of various database
            statements). */
Ub4 *num_bind_list; /* The value of *num_bind_list is a pointer to a list of the
            number of binds for each database statement. */
Ub4 *application_val; /* The value of *application_val is a pointer, sent from server-
            side 110 to client-side 102, that points to one or more
            parameters associated with or identifying the database
            application that compiled the database statements. */
Ub1 *transaction_ctx; /* The value of *transaction_ctx is a pointer to the context of
            all the batches that belong to the same transaction. */
Ub2 *transaction_ctx_length; /* The value of *transaction_ctx_length is a pointer to
            the length of the context of the transaction. */
Ub4 *define_list; /* The value of *define_list is a pointer to a list of defines for each
            database statement (that define the input parameters of
            the database statements to which the values are bound
            by the bind). */
Ub4 *num_define_list; /* The value of *num_define_list is pointer to a list of the
            number of defines for all of the database statements.
            */}
```

In alternative embodiments, the batch structure statement may not include all of the items listed above or may have other items in addition to or instead of those listed above. Any of the UB4 or UB2 data types may be substituted with int data types.

Pre-Execution Buffering of Incoming Statements

Figure 3:
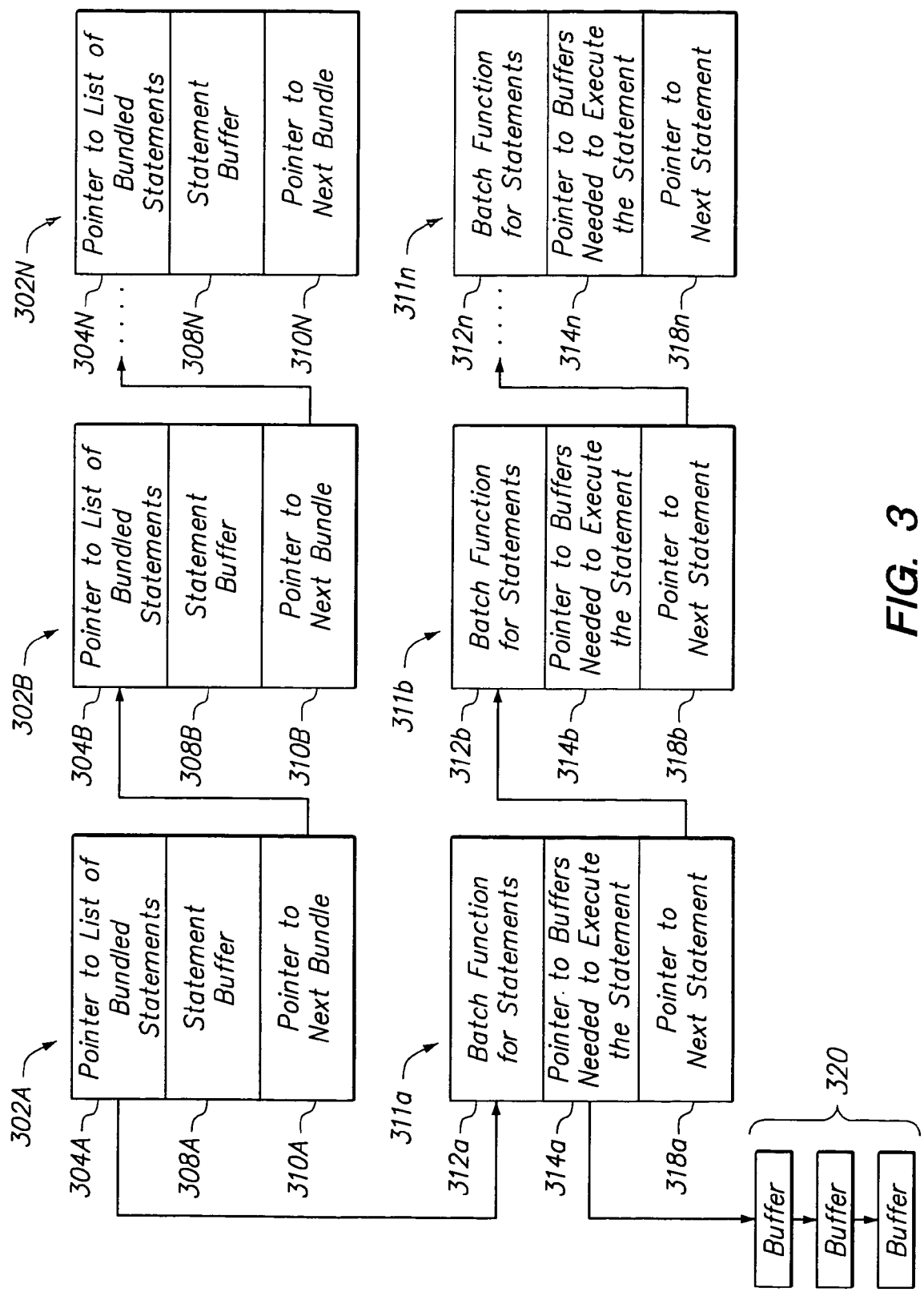
FIG. 3 shows an example of a batch buffer structure that may be used for receiving instructions prior to execution in the system of FIG. 1A or 1B.

FIG. 3 shows batch buffer structure 300, having bundle buffer structures 302A-302N. Bundle buffer structures 302A-302N include pointers to list of bundled statements 304A-304N, statement buffers 308A-308N, and pointers to next batches 310A-310N, respectively. Bundle buffer structure 302A has associated with it statement buffer structures 311a-311n. Statement buffer structures 311a-311n include batch functions for the statements 312a-312n, and pointers to buffers needed to execute the statement 314a-314n, pointers to next statements 318a-318n. Pointer to buffers needed to execute the statement 314a is associated with results buffers 320. In alternative embodiments, batch buffer structure 300 may not have all of the components listed above or may have other components in addition to or instead of those listed above.

The buffers associated with batch buffer structure 300 may be the pre-execution buffers, and may be among the buffers referenced by the pointer *prefetch_buffer. Batch buffer structure 300 is used for storing statements received at server-side 110 prior to execution. Batch buffer structure 300 may be used to facilitate delaying the execution of statements belonging to the same bundle until the entire bundle is received. Each of bundle buffer structures 302A-302N are buffers that contain information related to a bundle of a batch. Bundle buffer structures 302A-302N are placed in a linked list. Each pointer to list of bundled statements 304A-304N is a pointer that points to the buffers that contain information related to the individual statements. Each pointer to list of bundled statements 304A-304N points to the statement buffer structure corresponding to the first statement in the bundle. Each statement buffer 308A-308N contains the text of all of the statements in the bundle associated with the buffer and/or other information related to the statement. Each pointer to next bundle 310A-310N points to the next one of bundle buffer structures 302A-302N.

Each of statement buffer structures 311a-311n is a buffer that contains information related to individual statements of the bundle corresponding to bundle buffer structure 302A. Statement buffer structures 311a-311n are also placed in a linked list. For simplicity, the statement buffer structures of the bundles corresponding to bundle buffer structures 302B-302N are not shown in FIG. 3. Each batch function for the statement 312a-312n contains information such as parameters about an individual statement. Each pointer to buffers needed to execute the statement 314a-314n is a pointer to buffers that contain parameters necessary to execute the corresponding database statement. In the example of FIG. 3, pointer to buffers needed to execute the statement 314a associated with statement buffer structure 311a points to the statement buffer structure corresponding to the first statement of the bundle, statement buffer structure 311a. Each pointer to next statement 318a-318n points to the next statement in the bundle associated with bundle buffer structure 302A. Results buffers 320 are a set of buffers associated with a statement for storing results of execution. After execution, the execution results are stored in results buffers 320. Results buffers 320 are an embodiment of the post execution buffers discussed above. For simplicity only results buffers 320, which are associated with statement buffer structure 311a are illustrated, and the corresponding buffers associated with the other statement buffer structures 311b-311n are not illustrated.

In an embodiment, buffer structure 300 is created at server-side 110 (FIG. 1A) to facilitate implementing the parallel processing based on the structure batch definition parameters that are communications from client-side 102 (FIG. 1A) to server-side 110. In an embodiment, at the server-side 110, upon knowing that a batch of database statements is about to be received, the communication driver of server-side communication layer 114 (FIG. 1A) or program interface 154 batches the statements in batch structure 300 until server-side 110 receives an entire batch of statements 109 (FIG. 1A). Server-side 110 plans the execution of the batch of statements 109. Planning the execution of the batched statements includes creating buffers for the bundles according to buffer structure 300.

Buffers for Sequencing the Execution Results

Figure 4:
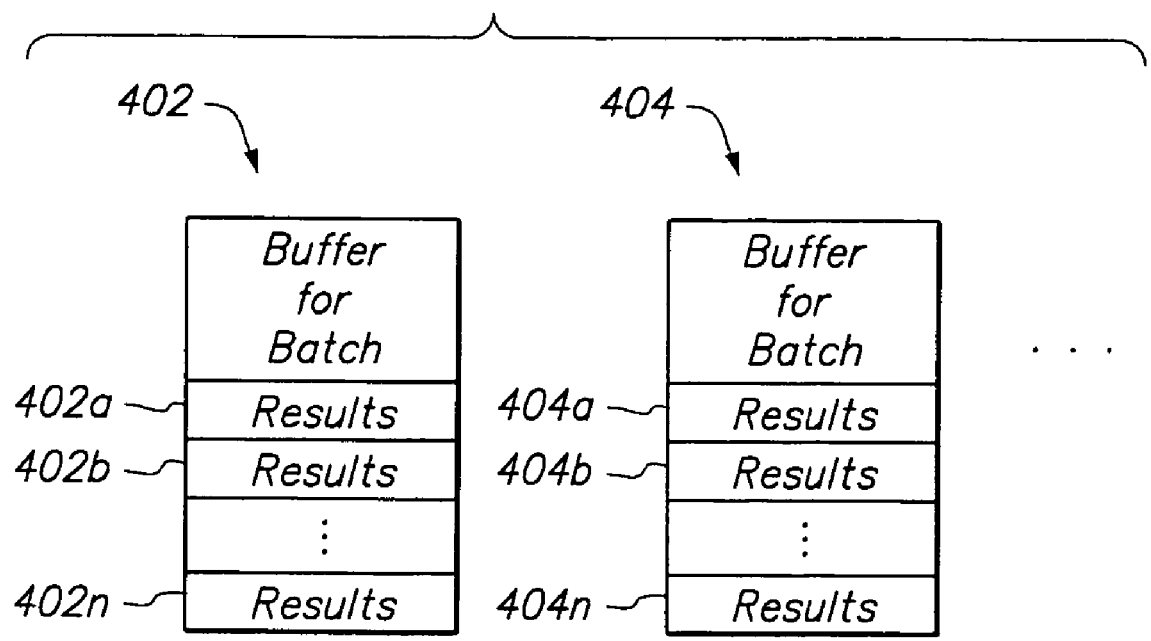
FIG. 4 shows an example of batch buffer structure that may be used for storing a batch of execution results in the system of FIG. 1A or 1B.

FIG. 4 shows a buffer structure 400 having a results buffer 402 and results buffer 404. Results buffer 402 includes results 402a-402n. Similarly, results buffer 404 includes results 404a-404n. The three dots indicate that there could be any number of buffers for batches. In alternative embodiments, buffer structure 400 may not have all of the components listed above or may have other components in addition to or instead of those listed above.

Results buffers 402, 404, etc. are an embodiment of results buffers 320 (the post execution buffers), and may be among the buffers referenced by the pointer *prefetch_buffer. After execution, results buffers 402, 404, etc. store results of executing batches. Results 402a-402n, 404a-404n, etc. are the results of executing the statements from batches associated with results buffers 402, 404, etc., respectively. Each of results 402a-402n, 404a-404n, etc. may be sent to client-side 102 (FIG. 1A or 1B) after results buffers 402, 404, etc., respectively, are filled. As the buffers for each batch are filled, messages from them are sent back to the client-side communication layer 106 in the order in which the database statements were located in their respective batches. In an embodiment, the client-side communication layer driver of client-side communication layer 106 waits until messages for an entire batch to be received and only then is the execution of that batch considered complete and forwarded to client-side interface layer 104 (FIG. 1A) or application 152 (FIG. 1B). In an alternative embodiment, batch buffer structure 400 and its associated buffers may be located on client-side 102 instead on server-side 110. Results buffers 402, 404, etc. may be arranged in a linked list or may be separate buffers that are not linked to one another.

Sequential Bundles Containing Statements for Concurrent Execution

Although in the example embodiments that are described, the bundles may be executed in parallel, and the statements within the bundles must be executed sequentially, in alternative embodiments, the bundles may be executed sequentially relative to other bundles, and statements within the bundles may be executed in parallel relative to other statements within the same bundle. Alternatively, in an embodiment, constructs are included in the protocol that allow the user to choose whether the bundles are executable in parallel or need to be executable sequentially. In an embodiment, some bundles may include an indication that their statements need to be executed sequential and other bundles may include an indication that statements within that bundle do not have a sequence that those statements are restricted to. In an embodiment, the user may be capable of designating that, in parts of the code, the bundles may executed concurrently with respect to each other, while in other parts the bundles must be executed sequentially with respect to one another. The programmer may also be capable of designating that in parts of the code the statements within the bundles are executed concurrently while in other parts of the code the statements within the bundles are executed sequentially with respect to one another.

For example, referring to FIG. 2A or 2B, in an alternative embodiment, bundle 204, statements 206, bundle 208, statements 210, and any other bundles and/or statements not contained within bundles must be run in the order in which they are designated by the batch (e.g., in the order in which they are located within the batch). In this alternative embodiment, statements within bundles 206 may be run in any order with respect to each other, and statements within bundle 208 or any other bundle may be run in any order with respect to other statements within the same bundle. In an embodiment, types of groupings of statements other than batches and bundles may be included within a batch, and types of groupings of statements other than batches or bundles may be included within a bundle.

A Method of Running a Group of Statements

Figure 5:
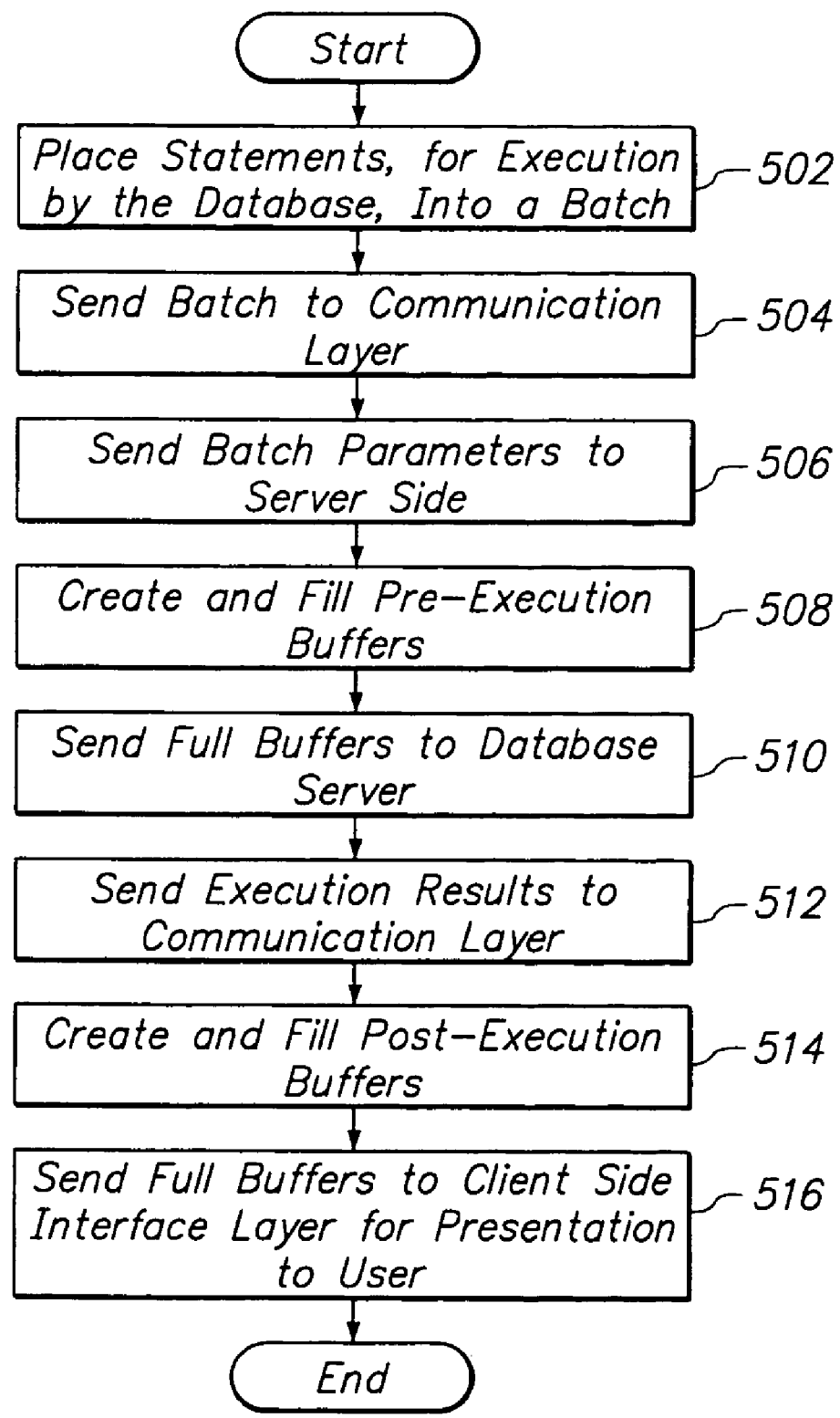
FIG. 5 is a flowchart that shows an example of a method of running a group of database statements using the system of FIG. 1A or 1B.

FIG. 5 is a method 500 of running a group of database statements. In step 502, database statements are placed into a batch having bundles at client-side interface layer 104 of client-side 102 (FIG. 1A). The batches may include a batch definition structure. Client-side 102 receives constructs, which were inserted into a preexisting program, indicating whether or not a particular sequence is required. In response to receiving the constructs, client-side 102 arranges the statements in the preexisting program into bundles of a batch.

In step 504, the program is sent, organized into a batch containing bundles, to client-side communication layer 106 (FIG. 1A). In step 506, the parameters of the batch structure definition are sent from client-side communication layer 106 to server-side communication layer 114 (FIG. 1A), or from application 152, via call interface 153, to program interface 154 (FIG. 1B), so that the appropriate pre-execution buffers (e.g., batch buffer structure 300, FIG. 3) can be created, which may include creating results buffers 320 (FIG. 3, which may be results buffers 402, 404, etc., FIG. 4). Additionally, in step 508, the database statements of the various buffers are placed into a plurality of different buffers, keeping statements belonging to the same bundle in the same buffer. In step 508, pre-execution buffers are created. In step 510, after a given bundle's buffer has received all statements of the bundle, the bundle of statements are sent via server-side interface layer 112 to database 118 for execution (FIG. 1A) or from program interface 154 to execution engine 156 (FIG. 1B). In step 512, post execution buffers (e.g., results buffers 320, FIG. 3, or results buffers 402, 404, etc., FIG. 4) are created. Alternatively, post execution buffers may be created in any of the earlier steps, such as part of step 504. In step 514, server-side 110, via server-side interface 112, and client-side communication layer 114 (FIG. 1A) or execution engine 156 and program interface 154 (FIG. 1B), begins to fill the post execution buffers (e.g., results buffers 320, FIG. 3, or results buffers 402, 404, etc., FIG. 4) with results 402a-n, 404a-n, etc. In step

516, after a given buffer has received results for all statements in the corresponding batch, the contents of the buffer are sent, via client-side communication layer 106, to client-side interface 104 (FIG. 1A) or to application 152 (FIG. 1B) for presentation to the user.

In alternative embodiments, method 500 may not nave all of the steps listed above or may have other steps in addition to or instead of those listed above. Additionally many of the steps listed above are not order dependent. For example, the post execution buffer structure 400 may be created anytime after receiving the buffer definition structure, but before receiving the results of the execution. Also, the buffers may be completed or otherwise modified while receiving data.

Creating Batches Based Client Applications

Regarding the insertion of batch indications and bundle indications into pre-existing human readable code, indications that apply to a statement include an indication of the bundle (a bundle indication) to which the statements belongs. The same bundle indications are used for all statements that have to be executed in a particular sequence relative to each other. Accordingly, a group of statements are identified that need to be executed in a particular sequence. The group of statements identified is then assigned a bundle indication. The process of identifying a group of statements that need to be executed in a particular sequence and assigning a bundle indication is repeated until no more groups of statements requiring a particular execution sequence can be found. Although each group of statements requiring a particular sequence of execution is first identified and then an indication that those statements belong to the same bundle is added, the identification of one group of statements having execution sequence requirements and the inclusion of bundle indication for another group may be performed in any order. For example, in an embodiment, first all groups of statements that need to be executed sequentially are identified, and then each group identified is assigned a bundle indication. Alternatively, groups of statements that do not need to be executed in any particular sequence are identified, and from the groups of statements that have no execution sequence requirements groups of statements that have executions sequence are deduced, and indications are added to each group of statements that must be executed according to a particular sequence that those statements are part of the same bundle.

Additionally, transmission information is added to the batch, and one or more indications are added indicating that the statements of the program belong to the same batch. The transmission information and/or the batch indications may be added prior to, concurrently, and/or after the bundle indications are added. Similarly, the transmission information may be added prior to, concurrently, and/or after the batch indications.

Prior to step 502 of method 500 (FIG. 5), a preexisting program (e.g., a human readable code), which was written without indications of (e.g., constructs indicating) whether the statements need to be executed in a particular sequence, may be modified to identify which statements must be executed in a particular sequence with respect to one another and which statements are not sequence dependent. Identifying sequence dependencies may involve inserting the indications (e.g., constructs) into the preexisting program, thereby associating different statements with different or the same batches and bundles depending on the restrictions on their sequence of execution, if any. In an embodiment, the determination of where in the preexisting code to put the indications (e.g., the determination of which statements of the preexisting code must be executed in a particular sequence) is performed with human intervention, in contrast to method 500, which is machine-implemented. Specifically, prior to step 502, a user input may be provided for a programmer to indicate where to insert constructs indicating which statements may be executed without any restrictions on the sequence of its execution and which statements must be executed in a particular sequence. In an alternative embodiment, the determination of where to insert the indications is made by machine. In an embodiment, after the constructs indicating the bundles in which statements are placed (if any) are inserted, the instructions pertaining to how to process the batch and its bundles are compiled, so that method 500 may be executed.

Sending Execution Results in Other Sequences

In an alternative embodiment, the results of executing the statements may be sent in a sequence that is different from the sequence in which the statements were located in the batch. To accomplish sending the results in another sequence, a plurality of buffers are used for storing results of execution. Each buffer can be tagged with a unique ID corresponding to the statement or bundle whose results that buffer stores. The ID can be sent back with each message. However, the tagging of the buffer, sending the ID and reading the ID may increase the communication overhead between the client and server. Also, the client may need to do extra processing to maintain and fill a set of buffers for all statements at its end too.

Other Variations

In an embodiment, one or more batches may be nested within a batch. Nesting a batch within a batch allows for a subset of the batch to have transmission information that is not common to the batch within which it is nested. In an embodiment, one or more batches may be nested within a bundle. Nesting a batch within a bundle facilitates designating that a subset of the statements within a bundle must be executed in a particular sequence with respect to other statements of the bundle, but do not have a particular sequence in which they must be executed with respect to one another. In an embodiment, within a batch there may be one or more other batches and one or more bundles, wherein within any one of or any combination of the bundles there may be one or more batches. In an embodiment there is no limit to the number of levels of nesting batches within batches, batches within bundles, and bundles within batches. For example, one may have batches containing one or more batches and one or more bundles, and within any combination of the bundles are one or more batches, which in turn contains one or more batches and one or more bundles.

In an alternative embodiment, rather than using TTISBR and TTIEBR flags, the results of execution may be stored in a queue that is polled periodically to see if it is ready to sent to client-side 102. In an alternative embodiment, batch buffer structure 300 and its associated buffers may be located on client-side 102 instead on server-side 110.

Hardware Overview

Figure 6:
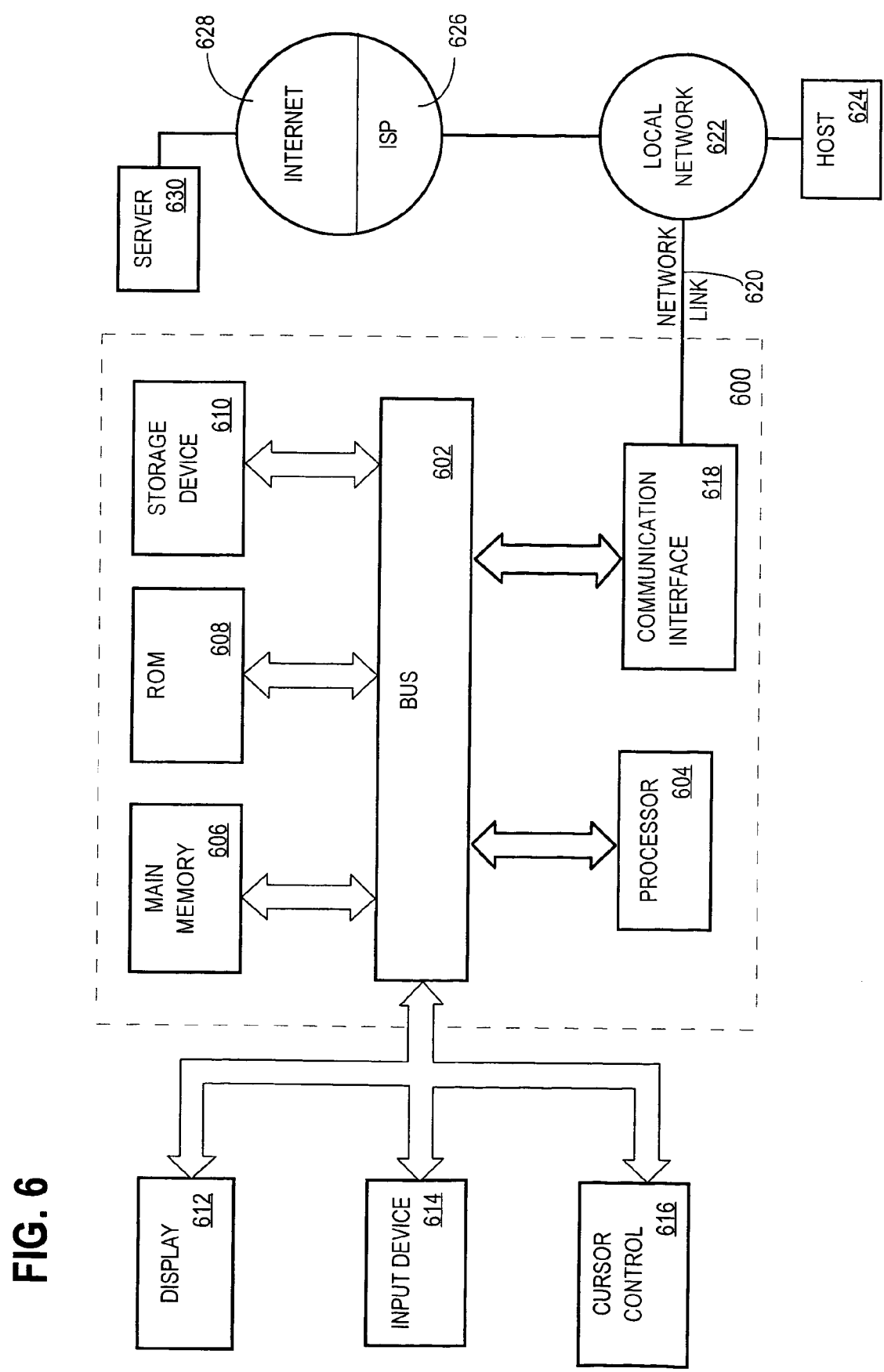
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. In an embodiment, client-side 102 and/or server-side 110 may reside on a machine such as computer system 600. In an embodiment, database 118 may be a machine such as computer system 600. According to one embodiment of the invention, the techniques described herein are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. The computer-readable medium is just one example of a machine-readable medium, which may carry instructions for implementing any of the methods and/or techniques (e.g., method 500) described herein. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method comprising steps of:

receiving, at a database server, from a client-side database application, a batch of SQL instructions for execution by the database server;

wherein the database server is a single program that performs operations on data in a database;

wherein the batch is received at the database server in a communication having only one set of transmission information for the batch, said communication having been directed to the database server by the client-side database application;

wherein the batch includes a first plurality of SQL instructions that belong to a first bundle;

wherein the batch includes a second plurality of SQL instructions that belong to a second bundle;

wherein the batch includes first data indications that indicate that the first plurality of SQL instructions belong to the first bundle;

wherein the batch includes second data indications that indicate that the second plurality of SQL instructions belong to the second bundle;

wherein the first data indications either (1) indicate that the first plurality of SQL instructions may be executed in parallel with respect to any other instruction of said first plurality of SQL instructions, or (2) indicate that the first plurality of SQL instructions are to be executed in a particular sequence relative to each other without respect to the sequence in which they are executed relative to instructions that belong to the second plurality of SQL instructions;

wherein the second data indications either (1) indicate that the second plurality of SQL instructions may be executed in parallel with respect to any other instruction of said second plurality of SQL instructions, or (2) indicate that the second plurality of SQL instructions are to be executed in a particular sequence relative to each without respect to the sequence in which they are executed relative to instructions that belong to the first plurality of SQL instructions;

executing the first plurality of database statements and the second plurality of database statements based on the first data indications and the second data indications;

wherein said executing comprises the database server performing a plurality of database operations specified in the first plurality of database statements and second plurality of database statements;

wherein the steps are executed by one or more computing devices.

2. The method of claim 1, wherein no execution results for the batch are passed from a client-side communication layer to a client-side interface for the database application until execution results for all SQL instructions in the batch have been received at the client-side.

3. The method of claim 1, further comprising:

the database server waiting for an execution of all SQL instructions in the batch to be complete; and the database server returning results of the execution to the client-side only after the waiting.

4. The method of claim 3, wherein two or more instructions are located within a particular sequence within the batch; and wherein the particular sequence of the two or more instructions within the batch determines a sequence in which results of executing the two or more instructions are returned regardless of a sequence in which the two or more instructions were executed.

5. The method of claim 4, wherein the particular sequence in which the instructions are located within the batch is the sequence in which the results of the executing of the two or more instructions are returned.

6. The method of claim 4, wherein the particular sequence in which the instructions are located within the batch is a different sequence than the sequence in which the two or more instructions are executed.

7. The method of claim 1, further comprising the database server storing the batch in a plurality of buffers; and wherein each buffer stores instructions that must be executed in a particular order with respect to one another.

8. The method of claim 1, further comprising the database server storing the batch in a plurality of buffers; and wherein instructions stored in different buffers do not have an indicated sequence within which they must be executed with respect to others of the instructions stored within others of the different buffers.

9. A machine-readable storage medium carrying one or more sequences of instructions which, when executed by one or more processors, causes the one or more processors to perform the method comprising steps of:

receiving, at a database server, from a client-side database application, a batch of SQL instructions for execution by the database server;

wherein the database server is a single program that performs operations on data in a database;

wherein the batch is received at the database server in a communication having only one set of transmission information for the batch, said communication having been directed to the database server by the client-side database application;

wherein the batch includes a first plurality of SQL instructions that belong to a first bundle;

wherein the batch includes a second plurality of SQL instructions that belong to a second bundle;

wherein the batch includes first data indications that indicate that the first plurality of SQL instructions belong to the first bundle;

wherein the batch includes second data indications that indicate that the second plurality of SQL instructions belong to the second bundle;

wherein the first data indications either (1) indicate that the first plurality of SQL instructions may be executed in parallel with respect to any other instruction of said first plurality of SQL instructions, or (2) indicate that the first plurality of SQL instructions are to be executed in a particular sequence relative to each other without respect to the sequence in which they are executed relative to instructions that belong to the second plurality of SQL instructions;

wherein the second data indications either (1) indicate that the second plurality of SQL instructions may be executed in parallel with respect to any other instruction of said second plurality of SQL instructions, or (2) indicate that the second plurality of SQL instructions are to be executed in a particular sequence relative to each without respect to the sequence in which they are executed relative to instructions that belong to the first plurality of SQL instructions;

executing the first plurality of database statements and the second plurality of database statements based on the first data indications and the second data indications;

wherein said executing comprises the database server performing a plurality of database operations specified in the first plurality of database statements and second plurality of database statements.

10. The machine-readable storage medium of claim 9, wherein no execution results for the batch are passed from a client-side communication layer to a client-side interface for the database application until execution results for all SQL instructions in the batch have been received at the client-side.

11. The machine-readable storage medium of claim 9, wherein the method further comprises:
the database server waiting for an execution of all SQL instructions in the batch to be complete; and
the database server returning results of the execution to the client-side only after the waiting.

12. The machine-readable storage medium of claim 11, wherein two or more instructions are located within a particular sequence within the batch; and
wherein the particular sequence of the two or more instructions within the batch determines a sequence in which results of executing the two or more instructions are returned regardless of a sequence in which the two or more instructions were executed.

13. The machine-readable storage medium of claim 12, wherein the particular sequence in which the instructions are located within the batch is the sequence in which the results of the executing of the two or more instructions are returned.

14. The machine-readable storage medium of claim 12, wherein the particular sequence in which the instructions are located within the batch is a different sequence than the sequence in which the two or more instructions are executed.

15. The machine-readable storage medium of claim 9, wherein the method further comprises the database server storing the batch in a plurality of buffers; and
wherein each buffer stores instructions that must be executed in a particular order with respect to one another.

16. The machine-readable storage medium of claim 9, wherein the method further comprises the database server storing the batch in a plurality of buffers; and
wherein instructions stored in different buffers do not have an indicated sequence within which they must be executed with respect to others of the instructions stored within others of the different buffers.

17. The method of claim 1:
wherein the first data indications (2) indicate that the first plurality of SQL instructions are to be executed in a particular sequence relative to each other without respect to the sequence in which they are executed relative to instructions that belong to the second plurality of SQL instructions; and
wherein the second data indications (2) indicate that the second plurality of SQL instructions are to be executed in a particular sequence relative to each without respect to the sequence in which they are executed relative to instructions that belong to the first plurality of SQL instructions.

18. The machine-readable medium of claim 9:
wherein the first data indications (2) indicate that the first plurality of SQL instructions are to be executed in a particular sequence relative to each other without respect to the sequence in which they are executed relative to instructions that belong to the second plurality of SQL instructions; and
wherein the second data indications (2) indicate that the second plurality of SQL instructions are to be executed in a particular sequence relative to each without respect to the sequence in which they are executed relative to instructions that belong to the first plurality of SQL instructions.

19. A machine-readable storage medium carrying one or more sequences of instructions which, when executed by one or more processors, causes the one or more processors to perform:
a database server exposing to a client a program interface, said program interface being implemented by the database server;
wherein the database server is a single program that performs operations on data in a database;
the database server receiving, in a single call from the client, said call having been directed by the client to the program interface, a plurality of database statements specifying a plurality of database operations;
in response to receiving the plurality of database statements, executing the plurality of database statements;
wherein executing the plurality of database statements comprises the database server performing the plurality of database operations specified in the plurality of statements.

20. The machine-readable medium of claim 19, wherein the one or more sequences of instructions, when executed by one or more processors, further causes the one or more processors to perform:
prior to the database server receiving the plurality of database statements, the database server receiving, in the single call, batch structure definition information that defines the format of the batch;
in response to receiving the batch structure definition information, the database server allocating one or more database statement buffers;
during the single call, for each database statement in the plurality of database statements, upon the database server receiving the database statement:
the database server storing the database statement in one of the one or more database statement buffers;
wherein executing the plurality of database statements comprises the database server executing each database statement in the one or more database statement buffers.

21. The machine-readable medium of claim 20, wherein allocating one or more database statement buffers is based on buffer size information in the batch structure definition information, wherein no database statement in a database statement buffer is executed until that database statement buffer is full.

22. The machine-readable medium of claim 20, wherein no database statement in the plurality of database statements is executed until the database server determines that the entire plurality of database statements has been received;
wherein determining that the entire plurality of database statements has been received comprises at least one of:
the single call terminating; or
determining that a certain number of database statements have been received, the number having been defined in the batch structure definition information.

23. The machine-readable medium of claim 19, wherein the one or more sequences of instructions, when executed by one or more processors, further causes the one or more processors to perform:
allocating one or more result buffers;
for each database statement in the plurality of database statements, storing execution results in one of the one or more result buffers.

24. The machine-readable medium of claim 23, wherein the one or more results buffers are allocated at the database server based on batch structure definition information sent in the single call, wherein the one or more sequences of instructions, when executed by one or more processors, further causes the one or more processors to perform at least one of:

sending execution results from the one or more results buffers only after all database statements in the plurality of database statements have been executed; or sending execution results from a particular results buffer in the one or more results buffers only after the particular results buffer is full.

25. The method of claim 20, wherein the one or more sequences of instructions, when executed by one or more processors, further causes the one or more processors to perform:

receiving, from the client, in the single call, for each database statement in the plurality of database statements, indications of to which of the one or more database statement buffers each of the plurality of database statements belong;

the database server determining an execution sequence for the plurality of database statements based on the one or more database statement buffers.

26. The method of claim 19, wherein the single call includes only a single set of transmission information defining the single call.

* * * * *